United States Patent [19]

Inoue

[11] 4,266,170
[45] May 5, 1981

[54] SAFETY ARRANGEMENT FOR NC SYSTEMS
[75] Inventor: Kiyoshi Inoue, Tokyo, Japan
[73] Assignee: Inoue-Japax Research Incorporated, Kanagawaken, Japan
[21] Appl. No.: 68,498
[22] Filed: Aug. 21, 1979
[30] Foreign Application Priority Data
  Sep. 6, 1978 [JP] Japan ............................ 53-122591[U]
[51] Int. Cl.³ ............................................ G05B 23/02
[52] U.S. Cl. ..................................... 318/565; 318/632
[58] Field of Search ............... 318/603, 632, 565, 571; 364/474

[56] References Cited
U.S. PATENT DOCUMENTS

| 3,463,979 | 8/1969 | Scobie et al. | 318/565 |
| 3,633,087 | 1/1972 | Vawter | 318/565 |
| 4,101,817 | 7/1978 | Maeda et al. | 318/632 X |
| 4,203,063 | 5/1980 | Loeb et al. | 318/603 |

Primary Examiner—B. Dobeck
Attorney, Agent, or Firm—Karl F. Ross

[57] ABSTRACT

An arrangement for monitoring the operation of a numerically controlled machine tool in which a motor drives an encoder whose pulses represent the angular displacement of the motor. Counters respond to the drive signal from the numerical control to the motor and the sensing signal resulting from the encoder to provide a first detection signal in the event of a deviation between the drive and sensing signals while additional counters are responsive to the numerical controller for generating a second detection signal when the extent of drive of the motor is not reached. From these detection signals, an error signal is derived.

7 Claims, 1 Drawing Figure

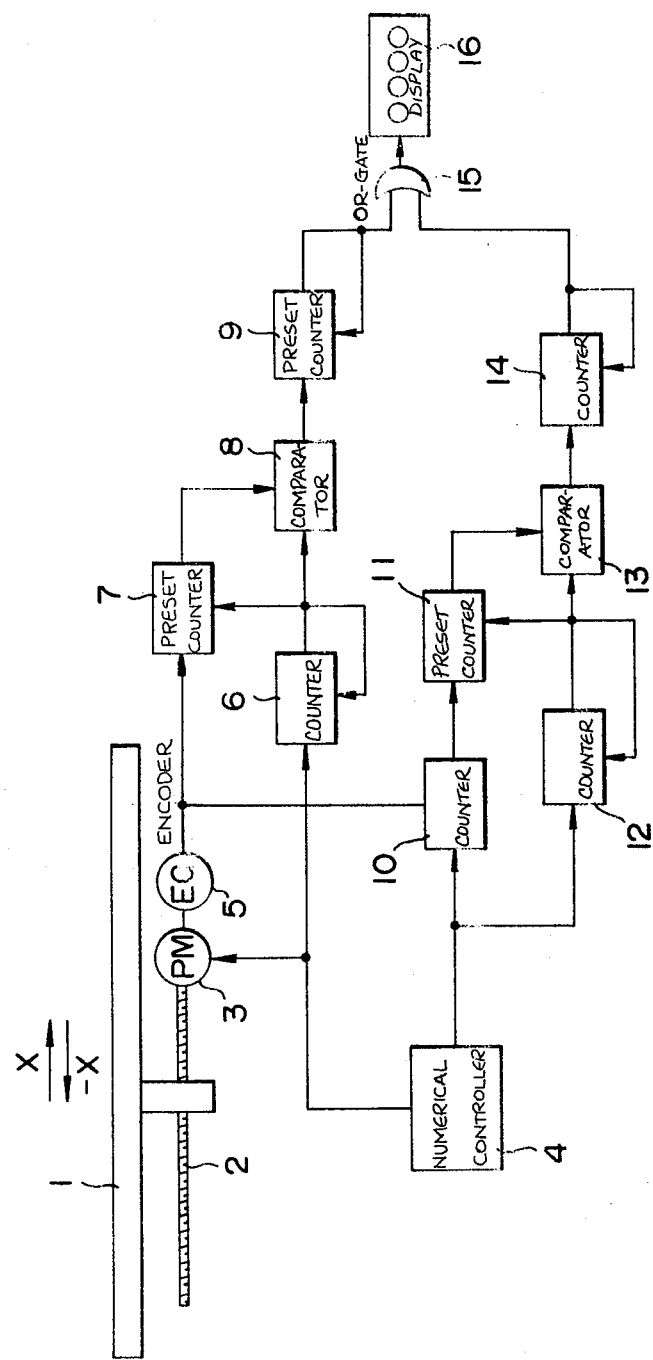

SAFETY ARRANGEMENT FOR NC SYSTEMS

FIELD OF THE INVENTION

The present invention relates generally to a numerical control system in which a movable element such as a spindle or workpiece-carrying table or bed in a machine tool is directed in accordance with a programmed numerical instruction. More particularly, the invention relates to a safety arrangement for numerical controlled systems whereby over-travel and inaccurate feed of the movable element arising from malfunctions of the mechanical system are effectively prevented.

BACKGROUND OF THE INVENTION

In conventional numerically controlled systems, a stepping or pulse motor has been commonly used to drive a movable element controlledly with an open loop system which, however, does not allow detection of errors which may occur in the feed or a disagreement between directed and actually driven feeds. The conventional systems have thus been incapable of detecting a possible feed error while they are being operated with the associated electromechanical components.

SUMMARY OF THE INVENTION

It is accordingly the object of the present invention to provide a safety arrangement for a numerically controlled system in a machine tool whereby an error in feed due to malfunctions of mechanical components associated with a directed motor for feeding the movable element is reliably detected to allow a high-precision control of the directed feed in accordance with programmed NC commands and instructions.

The above object is attained in accordance with the present invention by an arrangement for an electromechanical system for controlledly feeding a movable element driven by an electric motor, e.g., a stepping motor, in accordance with a programmed instruction from a numerical controller, wherein a drive signal, e.g., in the form of a series of electrical pulses, is applied from the numerical controller, the arrangement comprising: encoder means responsive to the angular displacement of the motor to provide a sensing signal, e.g., in the form of electrical pulses; means responsive to the drive signal and the sensing signal to provide a first detection signal in the presence of a deviation therebetween during each of successive predetermined time intervals; means responsive to said numerical controller for registering a predetermined extent of angular displacement of the motor to be effected by the drive signal in each of successive, divided displacement steps for the movable element; means having the registered extent of angular displacement of the motor set therein and responsive to the sensing signal to provide a second detection signal when the registered extent fails to be reached by the sensing signal in any of a predetermined sequential number of the successive displacement steps; and means for deriving an error signal from the first and second detection signals.

BRIEF DESCRIPTION OF DRAWING

The sole FIGURE in the drawing is a schematic diagram illustrating an embodiment of the present invention.

SPECIFIC DESCRIPTION

Referring to the drawing, a movable element 1 such as a spindle or workpiece-carrying table or bed in a machine tool is shown displaced in the directions of arrows x and -x via a lead screw 2 by the rotation of a pulse motor 3. The element may be displaced along more than one coordinates, e.g., along X and Y axes or X, Y and Z axes orthogonal to one another with additional corresponding motors and coupling lead screws provided to effect the respective axial displacements (not shown). The motor 3 is fed with drive pulses in a conventional manner from a numerical-control (NC) unit 4 whose structure and output functions are well known in the art.

In accordance with the present invention, an encoder 5 is coupled with the drive shaft of the motor 3 to sense a rotary displacement thereof by producing output pulses proportional in number to the displacement effected. Input pulses from the NC unit 4 applied to drive the motor 3 are also applied to a preset counter 6 while the output sensing pulses of the encoder 5 are applied to a preset counter 7. When a predetermined number of pulses are counted, the counters 6 and 7 provide respective output signals which are applied to a comparator 8. Upon finishing its preset count, the counter 6 is reset and at the same time resets the counter 7 so that both counters are conditioned to restart counting. In the absence of the output count-up signal from the counter 7 when the output or count-up signal is not received from the counter 6, the comparator 8 produces a non-coincidence signal in the form of a pulse which is applied to a preset counter 9 in the next stage. The latter counter upon counting up a predetermined number of the non-coincident pulses issues an output "error" or detection signal and is then reset to clear the count and reinitiate counting.

A separate counter 10 is also provided having a preset level input from the NC unit 4 with a signal corresponding to an extent of displacement to be effected by the movable element 1 in each individual of a series of divided machining blocks. The counter 10 is responsive to the output of the encoder 5 and provides an output pulse when the motor driven pulses sensed reach the preset count level and is then reset. The counter 10 is also adapted to be reset, before the count reaches the preset level, when it receives from the NC unit 4 a signal for the next machining block which acts to clear the accumulated count to restart counting.

The output signal of the preset counter 10 in the form of a pulse is applied to a preset counter 11 for counting therein. When a preset number of counts are completed, the counter supplies an output signal to a comparator 13 in the next stage.

A further counter 12 is responsive to checking signals from the NC unit 4 and raises its count level each time a check pulse is received from the latter. When a preset level of counts is reached, the counter 12 provides an output pulse which is applied to the comparator 13. At this instant, in the absence of the output signal from the counter 11, the comparator 13 issues a non-coincidence signal which is applied to a counter 14. When a predetermined number of the non-coincidence signals are counted, the latter produces an output "error" signal while being reset.

The first "error" or detection signal from the counter 9 in the first channel and the second "error" signal from the counter 14 in the second channel of the system are applied via an OR gate 15 to a display unit 16.

The preset counter 6 may have its preset level set at, say, five pulses. Every time the preset number of incoming signal pulse for driving the motor 3 have been received from the NC unit 4, the counter 6 produces an output signal which is compared at the comparator 8 with the output signal produced by the counter 7 counting drive sensing pulses produced at the encoder 5. When there is no error between commanded displacement and driven displacement, the count numbers at the counters 6 and 7 will agree with each other so that no output will develop from the comparator 8. Only in the presence of a difference between the two incoming signals does the comparator 8 produce an output or the coincidence signal and furnishes it to the preset counter 9.

The preset counter 9 has its preset count level set at a maximum number of counts or non-coincidence signals which are permissible to occur consecutively. When this number of counts are reached, the counter 9 produces an error signal and furnishes it via the OR gate to the display 16 where it is displayed in the form of a visual indication.

On the other hand, the NC unit 4 has an information stored therein which defines each of divided machining blocks, consisting individually of a line, a curved line or arc, which collectively form a desired contour to be machined in a workpiece, each block information being stored for distribution into individual axial or coordinate components. The information defining the start or end of an individual machining block and thus the extent of movement in each coordinate is accordingly provided from the NC unit 4 and is received by the counter 10 to set its preset level. With the extent of movement in a given machining block preset at its input, the counter 10 starts counting drive sensing pulses from the encoder 5 and, when they reach the preset level, produces an output pulse and furnishes it to the counter 11. This output signal is thus provided each instant the distance of feed actually driven coincides with the preset level or the moving element 1 has accomplished a given machining block directed. When, however, there is a difference between the directed feed and the driven feed will there be no output generated from the counter 10 or received by the counter 11. When the counter fails to receive the given number of drive sensing pulses from the encoder 5 before the next block command signal is received from the NC unit 4, the previous count will be cleared to reset the counter 10 which then starts recounting for the newly preset value. Then, when the latter is counted up indicating the accomplishment by the element 1 of a directed feed of the new machining block, the counter 10 provides the output pulse to the counter 11. In this manner, the counter 11 is allowed to selectively count those machining blocks in which the directed feed is precisely followed.

In the meantime, the counter 12 is also responsive to successive block signals from the NC unit 4. The counter 12 has its preset level set at a desired number of checking cycles over successive machining blocks. For example, checking may be performed for every three machining blocks to provide its output pulse. Output pulses of the counter 12 are applied to the comparator 13 which also receives output pulses from the counter 11. The comparator 13 provides an output selectively when there is a disagreement between the count of the counter 11 and the count of the counter 12 or in the presence of no-coincidence. The latter coincidence signals are applied to the counter 14 and, when they reach a preset level set therein, the counter 14 provides an error signal which is applied via the OR gate 15 to the display unit 16 where it is indicated in the form of a visual display.

In the foregoing, each of preset levels of preset counters is set optionally depending upon a particular machining mode to be carried out and at a maximum value which is permissible.

There is thus provided an error detection arrangement for a numerical control system whereby a double checking of the feed of a movable element directed by a numerical controller is effected. This effectively prevents an over-travel or inaccurate feed of the directed element and permits a precision control of the NC feed in accordance with programmed instructions.

What is claimed is:

1. A safety arrangement for an electromechanical system in a machine tool for controlledly feeding a movable element driven by an electric motor in accordance with a programmed instruction from a numerical controller, wherein a drive signal is applied from said numerical controller to said motor to angularly displace the same, the arrangement comprising:

encoder means responsive to the angular displacement of said motor to provide a sensing signal;

means responsive to said drive signal and said sensing signal to provide a first detection signal in the presence of a deviation therebetween during each of successive predetermined time intervals;

means responsive to said numerical controller for registering a predetermined extent of angular displacement of said motor to be effected by said drive signal in each of successive, divided displacement steps for said movable element;

means having said registered extent set therein and responsive to said sensing signal to provide a second detection signal when said registered extent fails to be reached by said sensing signal in any of a predetermined sequential number of said successive displacement steps; and means for deriving an error signal from said first and second detection signals.

2. The safety arrangement defined in claim 1 wherein the means responsive to said drive signal includes a first counter connected to said numerical controller and the means responsive to said sensing signal includes a second counter connected to said encoder and resettable by said first counter, said first and second counters being connected to a comparator.

3. The safety arrangement defined in claim 2 wherein said means responsive to said numerical controller includes a third counter connected to said numerical controller while the means responsive to said sensing signal for providing a second deviation detection signal includes a fourth counter connected to said encoder, a fifth preset counter being connected to said fourth counter and being resettable by said third counter, the third and fifth counters being connected to a respective comparator.

4. The safety arrangement defined in claim 3 wherein at least one of said comparators feeds a preset counter which is automatically reset in response to its output.

5. The safety arrangement defined in claim 4 wherein each of said comparators feeds a respective preset counter resetting in response to its output.

6. The safety arrangement defined in claim 5 further comprising an OR-gate, said comparators feeding said OR-gate.

7. The safety arrangement defined in claim 6 further comprising a display connected to the output of said OR-gate.

* * * * *